US012679179B2

(12) United States Patent
  Grech

(10) Patent No.:  US 12,679,179 B2
(45) Date of Patent:      Jul. 14, 2026

(54) VEHICLE ROOF MODULE

(71) Applicant: Bayerische Motoren Werke Aktiengesellschaft, Munich (DE)

(72) Inventor: Adrian Grech, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 214 days.

(21) Appl. No.: 18/785,295

(22) Filed: Jul. 26, 2024

(65) Prior Publication Data

US 2025/0033439 A1      Jan. 30, 2025

(30) Foreign Application Priority Data

Jul. 27, 2023   (DE) ..................... 10 2023 119 997.8

(51) Int. Cl.
  *B60J 1/20* (2006.01)
  *B60J 7/00* (2006.01)
  *B62D 25/06* (2006.01)
(52) U.S. Cl.
  CPC ........... *B60J 1/2011* (2013.01); *B60J 7/0015* (2013.01); *B62D 25/06* (2013.01)
(58) Field of Classification Search
  CPC ......... B60J 1/2011; B60J 1/001; B60J 7/0015
  USPC ................................................. 296/211, 214
  See application file for complete search history.

(56) References Cited

U.S. PATENT DOCUMENTS 7,793,702 B2 *  9/2010  Biewer ................... B60J 7/0015
                                                   296/214
2023/0364975 A1 * 11/2023 Rockelmann .......... B60J 1/2052

FOREIGN PATENT DOCUMENTS

DE        19943243 A1 *  4/2001  .............. B60J 1/001
DE     102019202768 A1 *  9/2020  ............. B60J 7/0007
DE     102024108962 A1 * 10/2025  ............. B62D 25/06
EP       2 857 241 B1     7/2020

OTHER PUBLICATIONS

English translation of DE 19943243 (Year: 2001).*
German-language Office Action issued in German Application No. 10 2023 119 997.8 dated Feb. 29, 2024 (4 pages).

* cited by examiner

*Primary Examiner* — Joseph D. Pape
(74) *Attorney, Agent, or Firm* — Crowell & Moring LLP

(57)          ABSTRACT

A vehicle roof module has a glass roof part extending at least over a portion of a vehicle roof surface, the lower face of which overlaps in some regions with a vehicle roof lining. A sunshade unit having a textile is provided, which, in order to shade a vehicle interior, can be arranged so as to be detachable by means of a magnetic connection unit between the lower face of the glass roof part and the vehicle interior. The connection unit has at least one groove extending in the transverse direction or in the longitudinal direction of the glass roof part, which groove is formed so as to be open on a side of the vehicle roof lining facing away from the vehicle interior. A molded part which is adapted to the shape of the groove can be hooked into the groove from above and is rigidly connected to the textile. The connection unit is formed with at least one magnet in the region of the groove, and the molded part consists at least in some regions of ferromagnetic metal. Alternatively, the connection unit may be formed with a ferromagnetic metal in the region of the groove, whereas the molded part has at least one magnet.

7 Claims, 2 Drawing Sheets

VEHICLE ROOF MODULE

CROSS REFERENCE TO RELATED APPLICATION

This application claims priority under 35 U.S.C. § 119 from German Patent Application No. DE 10 2023 119 997.8, filed Jul. 27, 2023, the entire disclosure of which is herein expressly incorporated by reference.

BACKGROUND AND SUMMARY

The invention relates to a vehicle roof module having a glass roof part extending at least over a portion of a vehicle roof surface, a lower face of which overlaps in some regions with a vehicle roof lining, and a sunshade unit.

EP 2 857 241 B1 discloses a flexible sunshade system which comprises a vehicle roof and a roof element located in the vehicle roof. A roller sunblind is arranged under the roof element. The vehicle roof has at least longitudinal rails for guiding the roller sunblind up, by means of which rails the roller sunblind can be moved in the direction of the vehicle longitudinal axis. In addition, the sunshade system comprises at least one additional guide device between the longitudinal rails for guiding the roller sunblind along the longitudinal axis of the vehicle. The additional guide device extending along the longitudinal axis of the vehicle consists of at least one metalized and/or metal track and magnets in order to thereby produce a magnetic connection between the roof element and the roller sunblind.

Disadvantageously, the sunshade system has a complex design and, in particular in the region of the lateral guide rails, restricts the headroom of vehicle occupants in an undesirable manner.

It is an object of the present invention to provide a vehicle roof module which has a simple design and is advantageous in terms of installation space.

According to the invention, this object is achieved by a vehicle roof module having the features of the independent claim(s).

The vehicle roof module according to the invention is formed with a glass roof part extending at least over a portion of a vehicle roof surface. Some regions of a lower face of the glass roof part overlap with a vehicle roof lining.

In this arrangement, it is possible for the lower face of the glass roof part to be covered peripherally in each case by the vehicle roof lining.

Furthermore, the vehicle roof module comprises a sunshade unit having a textile which, in order to shade a vehicle interior, can be arranged so as to be detachable by means of a magnetic connection unit between the lower face of the glass roof part and a vehicle interior.

According to the invention, the magnetic connection unit comprises at least one groove extending in the transverse direction or in the longitudinal direction of the glass roof part, which groove is provided in a region of the vehicle roof lining which adjoins the glass roof part. The groove is formed so as to be open on a side of the vehicle roof lining facing away from the vehicle interior. A molded part of the magnetic connection unit can be hooked into the groove from above. The shape of the molded part can be adapted to the shape of the groove so that the molded part engages in the groove in an interlocking manner with at least approximately zero clearance. In addition, the molded part can be rigidly connected to the textile preferably by sewing, bonding and the like.

In order to be able to keep the molded part engaged with the groove by means of a simple design, and, if necessary, also guide the molded part back out of the groove with minimal effort, the groove can be formed with at least one magnet, and the molded part can consist in at least some regions of ferromagnetic metal.

In addition, for this purpose, it is also possible for the groove to be formed with a ferromagnetic metal, whereas the molded part is formed with at least one magnet or is in the form of a magnet itself.

In one development of the vehicle roof module according to the invention, the vehicle roof lining and the glass roof part are at a distance from one another in the vertical direction in the region of the groove and delimit a gap. Through the gap, the molded part can be guided out of the vehicle interior and can be hooked into the groove outside the vehicle interior. Furthermore, when an operator disassembles the sunshade unit, starting from the vehicle interior, the molded part can firstly be guided out of the groove and guided through the gap back into the vehicle interior and removed.

In order to insert the molded part into the groove and remove the molded part therefrom in a simple manner, in developments of the vehicle roof module according to the invention, at least one guide element is arranged on the vehicle roof lining and/or on the glass roof part. By means of the guide element, on the side of the gap facing away from the vehicle interior, the molded part can be inserted into the groove or removed therefrom while being guided in a defined manner.

In order to be able to assemble and disassemble the sunshade unit in a simple manner, the magnetic connection unit comprises at least one additional groove extending in the transverse direction or in the longitudinal direction of the glass roof part, which groove is arranged at a distance from the groove in the longitudinal direction or in the transverse direction of the glass roof part and is positioned on the side of the vehicle roof lining facing away from the vehicle interior. In addition, the connection unit comprises at least one additional molded part which is connected to the textile and can be hooked into the additional groove or removed therefrom through an additional gap between the glass roof part and the vehicle roof lining. In this case, the additional groove or the additional molded part can have a magnet, whereas the additional molded part or the additional groove is formed so as to be ferromagnetic in at least some regions.

In the case of grooves extending in the longitudinal direction, the textile is spanned therebetween in the vehicle transverse direction of the glass roof part. By contrast, in the case of grooves extending in the transverse direction, the textile is spanned therebetween in the longitudinal direction of the glass roof part.

A length of the textile and a distance between the grooves can be coordinated with one another in the longitudinal direction or in the transverse direction of the glass roof part in such a way that the textile, when the molded parts are hooked in, has a defined fabric tension, relative to which the textile has a substantially planar progression between the grooves.

The textile can be connected in the region between the grooves to tensioning elements extending in the transverse direction, in the longitudinal direction and/or in the diagonal direction of the glass roof part. By means of the tensioning elements, when the molded parts are hooked into the grooves, the textile can be attached in at least some regions to the lower face of the glass roof part. In a simple manner, the textile can then be positioned above the passenger compartment so as to be adapted to the curvature of the glass roof part which is preferably provided in the longitudinal and/or transverse direction. It is thereby possible to achieve a high-quality visual appearance of the vehicle interior by means of a simple design.

Furthermore, it can be provided that at least one of the molded parts and/or at least one of the grooves consists of a plurality of magnets at a distance from one another in the transverse direction or in the longitudinal direction of the glass roof part, which magnets are preferably sewn into the textile. In such an embodiment, when not in use, the textile sunshade unit can be folded up in a simple manner and preferably stored in a storage compartment in a manner which is advantageous in terms of installation space.

Further advantages and advantageous developments of the invention can be found in the claims and the exemplary embodiment described in principle with reference to the drawing.

DETAILED DESCRIPTION OF THE DRAWINGS

Figures 1, 2:
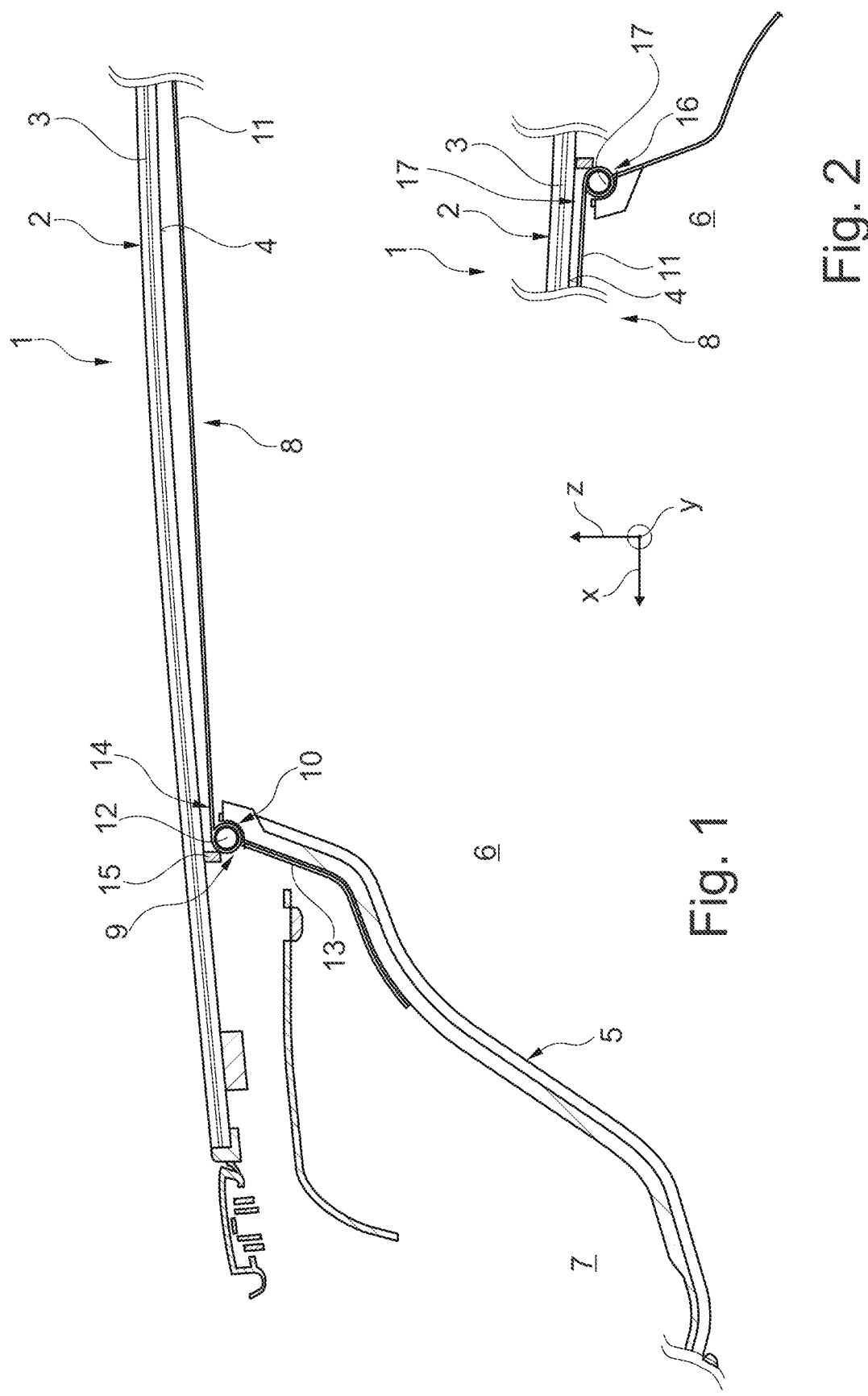
FIGS. 1 and 2 are partial longitudinal sectional views of a vehicle roof module according to an embodiment of the present invention.

FIGS. 1 and 2 each show a partial longitudinal sectional view of a vehicle roof module 1 which comprises a glass roof part 3 extending over a portion of a vehicle roof surface 2. Part of a lower face 4 of the glass roof part 3 overlaps with a vehicle roof lining 5. The region of the vehicle roof lining 5 shown in FIG. 1 extends in the vehicle vertical direction Z from the lower face 4 of the glass roof part 3 toward a vehicle interior 6, in the vehicle longitudinal direction X toward a vehicle rear 7, and in the vehicle transverse direction Y substantially over the entire width of the vehicle roof.

In another embodiment of the vehicle roof module 1, the region of the vehicle roof lining 5 shown in FIG. 1 extends in the vehicle vertical direction Z from the lower face 4 of the glass roof part 3 toward a vehicle interior 6, in the vehicle transverse direction Y toward a vehicle side, and in the vehicle longitudinal direction X substantially over the entire length of the vehicle roof.

In addition, the vehicle roof module 1 comprises a sunshade unit 8 having a flexible textile 11, which, in order to shade the vehicle interior 6, is detachably connected to the vehicle roof lining 5 by means of a magnetic connection unit 9 and is arranged between the lower face 4 of the glass roof part 3 and the vehicle interior 6.

In the exemplary embodiment shown, the connection unit 9 has a groove 10 extending in the vehicle transverse direction Y. The groove 10 is formed so as to be open on a side of the vehicle roof lining 5 facing away from the vehicle interior 6. In the spanned state shown, the sunshade unit 8 is hooked in by a molded part 12 adapted to the shape of the groove 10, the molded part 12 being rigidly connected to the textile 11. The molded part 12 is in the form of a magnet which interacts with a ferromagnetic metal layer 13 of the groove 10 of the vehicle roof lining 5 so that the molded part 12 is securely held in the groove 10 magnetically.

The design of the groove 10 of the vehicle roof lining 5 with the ferromagnetic metal layer 13 makes it possible, in a simple manner, to form the vehicle roof lining 5, on the side facing the vehicle interior 6, with a visually appealing material, which can be for example a textile, plastics material, leather or the like.

The vehicle roof lining 5 and the glass roof part 3 are at a distance from one another in the vehicle vertical direction Z in the region of the groove 10 and delimit a gap 14, through which the molded part 12 can be hooked into the groove 10 or can be removed therefrom. In addition, a guide element 15 is formed on the glass roof part 3, along which element the molded part 12 can be inserted in the groove 10 or removed therefrom in each case in a defined manner.

In addition, the magnetic connection unit 9 comprises an additional groove 16 extending in the transverse direction Y of the glass roof part 3, which groove takes substantially the same form as the groove 10. The additional groove 16 is arranged at a distance from the groove 10 in the longitudinal direction X of the glass roof part 3 and is positioned on the side of the vehicle roof lining 5 facing away from the vehicle interior 6. Furthermore, the magnetic connection unit 9 comprises at least one additional molded part 17 connected to the textile 11, which molded part is formed in the same manner as the molded part 12. The additional molded part 17 can be hooked into the additional groove 16 or removed therefrom through an additional gap 18 between the glass roof part 3 and the vehicle roof lining 5. In this case, the additional groove 16 or the additional molded part 17 has a magnet, whereas the additional molded 17 part or the additional groove 16 is formed at least in some regions so as to be ferromagnetic, in order to magnetically hold the additional molded part 17 in the additional groove 16.

A length of the textile 11 and a distance between the groove 10 and the additional groove 16 of the vehicle roof lining 5 at a distance therefrom in the vehicle longitudinal direction X are coordinated. In this case, the coordination is such that the textile 11, when the molded parts 12 and 17 are hooked in, has a defined fabric tension so that the textile 11 is spanned between the grooves 10 and 16 in a substantially planar manner. A preferably central sagging of the textile 11, which has a negative effect on the overall visual appearance of a vehicle formed with the vehicle roof module 1 is then prevented in a simple manner.

Figure 3:
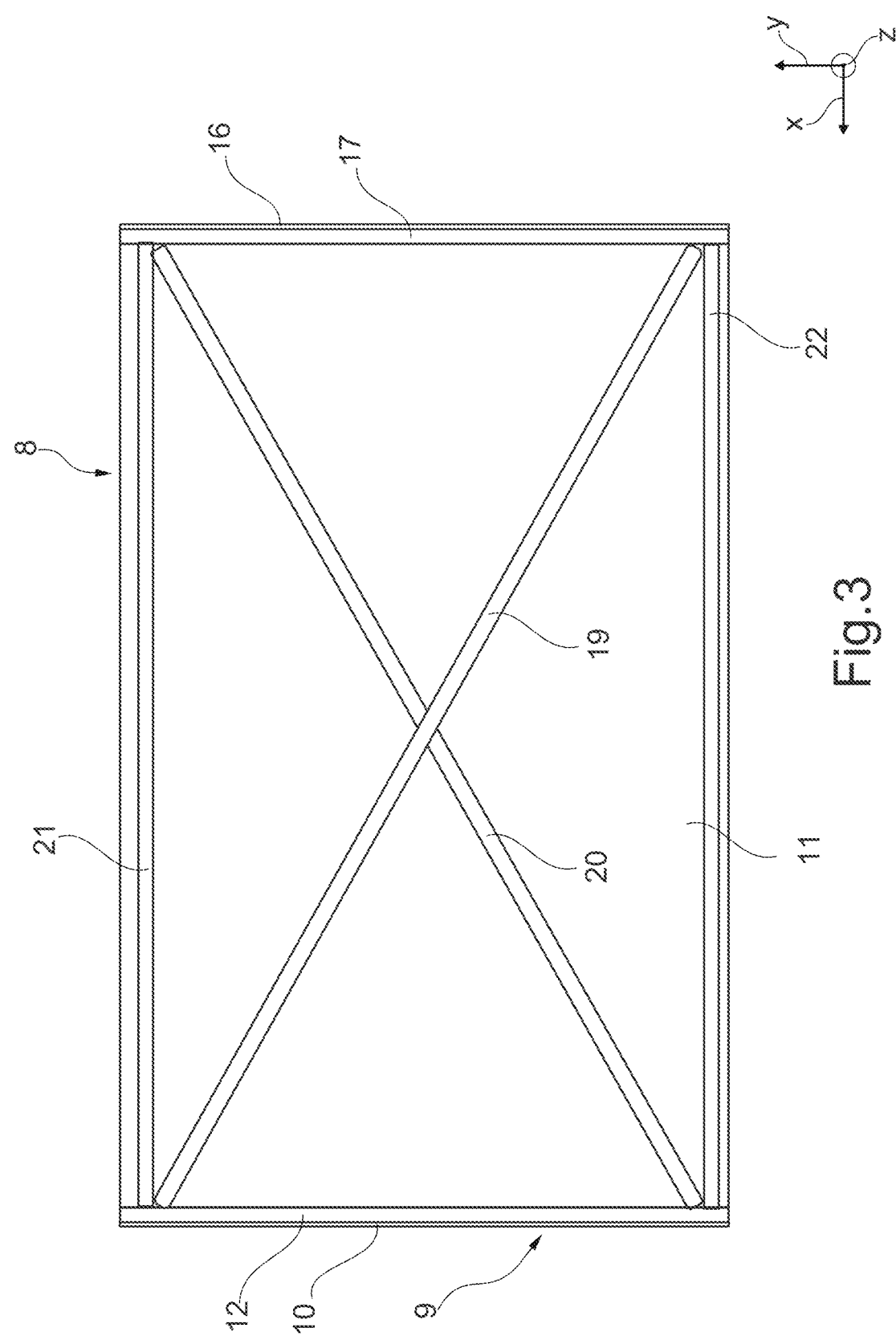
FIG. 3 is a view from above of the sunshade unit.

In addition, FIG. 3 shows the sunshade unit 8 and the grooves 10, 16, the molded parts 12, 17, the textile 11 and tensioning elements 19, 20, 21 and 22 connected to the textile 11 in a view from above. The tensioning elements 19, 20 extend in the longitudinal direction Y and the tensioning elements 21, 22 extend in the diagonal direction of the glass roof part 3. By means of the tensioning elements 19 to 22, when the molded parts 12 and 17 are hooked into the grooves 10 and 16, the textile 11 is attached at least in some regions to the lower face of the glass roof part 3. In a simple manner, the textile is then positioned above the passenger compartment 6 so as to be adapted to the curvature of the glass roof part 3 which is provided in the longitudinal and/or transverse direction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 vehicle roof module
2 vehicle roof surface

5

6

3 glass roof part
4 lower face of the glass roof part
5 vehicle roof lining
6 vehicle interior
7 vehicle rear
8 sunshade unit
9 magnetic connection unit
10 groove
11 textile
12 molded part
13 ferromagnetic metal layer
14 gap
15 guide element
16 additional groove
17 additional molded part
18 additional gap
19 tensioning element
20 tensioning element
21 tensioning element
22 tensioning element
X vehicle longitudinal direction
Y vehicle transverse direction
Z vehicle vertical direction

What is claimed is:

1. A vehicle roof module, comprising:
a glass roof part extending at least over a portion of a vehicle roof surface, a lower face of which overlaps in some regions with a vehicle roof lining;
a sunshade unit having a textile which, in order to shade a vehicle interior, is arranged so as to be detachable via a magnetic connection unit between the lower face of the glass roof part and a vehicle interior,
wherein
the magnetic connection unit has at least one groove extending in a transverse direction or in a longitudinal direction of the glass roof part, at least one groove is provided in a region of the vehicle roof lining which adjoins the glass roof part,
the at least one groove is formed so as to be open on a side of the vehicle roof lining facing away from the vehicle interior, into which at least one molded part of the magnetic connection unit is hooked from above, a shape of which is adapted to the shape of the at least one groove,
the at least one molded part is rigidly connected to the textile of the sunshade unit, and
(i) the at least one groove is formed with at least one magnet or as a magnet, and the at least one molded part is made of ferromagnetic metal at least in some regions, or
(ii) the at least one groove is formed with a ferromagnetic metal, and the at least one molded part is formed with at least one magnet.

2. The vehicle roof module according to claim 1, wherein the vehicle roof lining and the glass roof part are at a distance from one another in a vertical direction in the region of the at least one groove and delimit at least one gap, through which the at least one molded part is hookable into the groove and is removable therefrom.

3. The vehicle roof module according to claim 1, wherein at least one guide element is arranged on the vehicle roof lining and/or on the glass roof part, along the at least one guide element the at least one molded part is hooked into the at least one groove or is removed therefrom while being guided in a defined manner.

4. The vehicle roof module according to claim 1, wherein the magnetic connection unit comprises at least one additional groove extending in the transverse direction or in the longitudinal direction of the glass roof part, at least one additional groove is arranged at a distance from the at least one groove in the longitudinal direction of the glass roof part and is positioned on a side of the vehicle roof lining facing away from the vehicle interior,
at least one additional molded part is connected to the textile, which can be hooked into the at least one additional groove or can be removed therefrom through an additional gap between the glass roof part and the vehicle roof lining,
the at least one additional groove or the at least one additional molded part having a magnet, whereas the at least one additional molded part or the at least one additional groove is formed at least in some regions with a ferromagnetic metal.

5. The vehicle roof module according to claim 4, wherein a length of the textile and a distance between the groove and additional groove in the longitudinal direction or in the transverse direction of the glass roof part are coordinated with one another such that, when the at least one molded part and the at least one additional molded part are hooked in, the textile has a defined fabric tension, relative to which the textile has a substantially planar progression between the at least one groove and the at least one additional groove.

6. The vehicle roof module according to claim 4, wherein the textile is connected in a region between the at least one groove and the at least one additional groove to tensioning elements extending in the transverse direction, in the longitudinal direction, and/or in the diagonal direction of the glass roof part, which tensioning elements attach the textile at least in some regions to the lower face of the glass roof part when the at least one molded part and the at least one additional molded part are hooked in.

7. The vehicle roof module according to claim 1, wherein the at least one molded part and/or the at least one groove comprises a plurality of magnets at a distance from one another in the transverse direction or in the longitudinal direction of the glass roof part.

* * * * *